Dec. 20, 1960   H. C. EBERLINE   2,965,759
PROPORTIONAL COUNTER
Filed Jan. 16, 1957
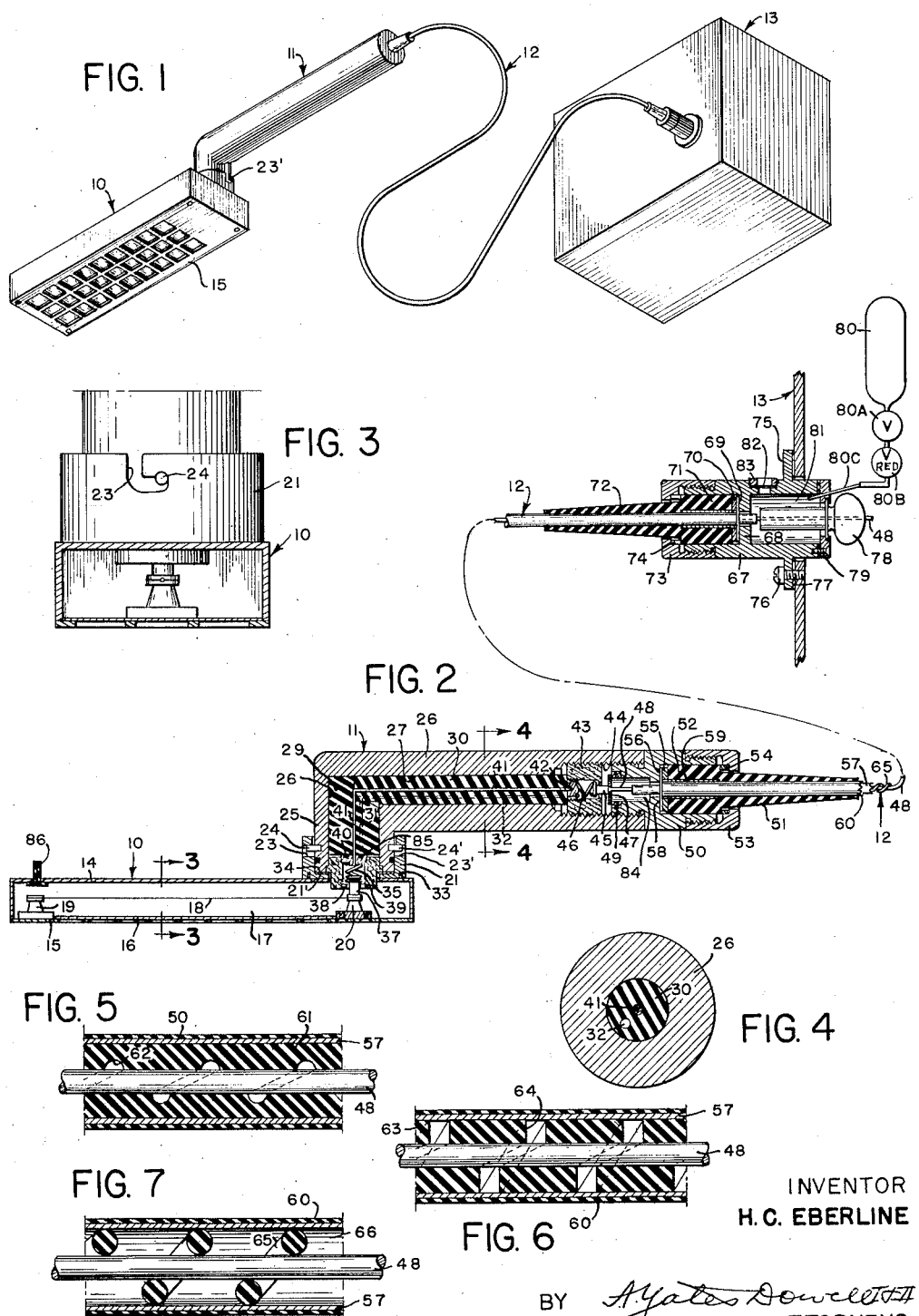
INVENTOR
H. C. EBERLINE
BY A. Yates Dowell III
ATTORNEYS

United States Patent Office

2,965,759
Patented Dec. 20, 1960

---

2,965,759

PROPORTIONAL COUNTER

Howard C. Eberline, Santa Fe, N. Mex., assignor to Eberline Instrument Division of Reynolds Electrical and Engineering Co., Inc., Santa Fe, N. Mex.

Filed Jan. 16, 1957, Ser. No. 634,496

18 Claims. (Cl. 250—83.6)

The present invention relates to radiation detection and measurement and more particularly to alpha ray radiation emitted from either natural materials or the product of the various processes involving change of atomic structure or any radiation which produces alpha rays in any manner.

Heretofore various types of equipment have been used for measuring radiation, including alpha ray radiation, but the equipment and devices used have not always been entirely satisfactory due to inaccuracies in the measurements, which inaccuracies are believed to be caused at least in part by variations in the materials in the probe head and particularly in the gaseous material in the probe head which serves to insulate one electrode from the other until the alpha ray radiation passes into the gaseous material to alter the insulating or dielectric characteristics thereof. As a result of the inconsistency of the gaseous material presently used, the readings in the instruments resulting from the passage of current across the electrodes has not always been a true indication of the actual amount of alpha radiation present and therefore it has been difficult to obtain precise information in determining the presence of radioactive materials under varying climatic and other natural circumstances.

An object of the present invention is to provide an easy way to use a radiation detector with greater accuracy.

Another object of the present invention is to provide alpha radiation detection equipment in which the electrodes in the probe head are maintained in a gaseous atmosphere of constant and uniform characteristics.

A further object of the invention is to provide means to supply a particular gas of known purity to the hollow chamber of a probe head without interfering with the maneuverability of the probe head.

Another object of the invention is to provide a gas passage in a coaxial cable for carrying gas from one end of the cable to the other end.

A further object is to provide a continuous supply of gas from a case to a probe head of a radiation detector by the provision of a passage for the gas which does not interfere with the operation of the probe head.

Another object is to provide a probe head with a supply of gas which permits reduction of the voltage between electrodes while maintaining and actually improving the radiation responsiveness of the device.

A further object is to provide a coupling for cooperation with a coaxial cable to provide for insulated separation of the conductors thereof and provide for a closed passage of gas within the cable.

Further objects will be apparent as the description proceeds and upon reference to the accompanying drawing wherein:

Fig. 1 is a perspective view of a radiation detector showing the probe head, the case for the instruments and supplies necessary for use therewith and a coaxial cable for connecting the probe head to the case;

Fig. 2, a longitudinal vertical section of the probe head with its handle attached and the connections of a coaxial cable to the handle and the instrument case;

Fig. 3, a vertical transverse section of the probe head taken substantially on line 3—3 of Fig. 2 showing the bayonet type connection between the probe head and its handle;

Fig. 4, a vertical transverse section through the handle taken substantially on line 4—4 of Fig. 2;

Fig. 5, a longitudinal section of one form of coaxial cable which may be used for supplying gas to and carrying electrical impulses from the probe head;

Fig. 6, a longitudinal section of a modified form of coaxial cable showing the helical gas passage therein; and Fig. 7, a longitudinal section of a further modification of coaxial cable.

Briefly stated, the present invention comprises a hollow probe head having a chamber with a diaphragm covered window therein and with an electrode therein, insulated from the walls of the chamber, a one-way check valve of the type used in gas masks being provided for removal of gas under excess pressure in such head while preventing air from being drawn inwardly. A removable handle is mounted on the probe head and has a conductor for electrical contact with the insulated electrode, the outer portion of the handle with the walls of the chamber serving as the second conductor. The handle is provided with a coupling by means of which the handle is connected to a coaxial cable providing electrical connection between the center conductor of the coaxial cable and the insulated electrode and providing electrical connection between the tubular conductor of the coaxial cable and the probe head. The coaxial cable is connected to the instrument case by means of a coupling providing for electrical connections between the conductors of the coaxial cable and the co-operating conductors of the casing. The handle, the coaxial cable and the couplings of the coaxial cable to the handle and to the case are constructed to provide a continuous passage for gas from the instrument case to the probe head and means are provided in the case to supply gas for passage through the coaxial cable and handle and thence into the probe head to maintain a gaseous medium of constant characteristics therein whereby accurate measurement of rays passing through the window in the probe head can be made.

Referring more particularly to the drawings, a probe head 10 is removably attached to and supported by handle 11 which handle is connected by means of a coaxial cable 12 to an instrument and the supply case 13. The handle and coaxial cable provide for carrying electrical energy and also for conducting gas between the instrument case and the probe head.

The probe head 10 includes a rectangular open bottom housing 14, the bottom of which is closed by a removable grille 15 over the inner face of which a thin diaphragm 16 is mounted in fluid tight relation thereby providing a chamber 17. The diaphragm 16 is made of extremely thin plastic approximately .0002 in. in thickness and being of sufficient thinness to allow the passage of alpha rays and when plastic is of such thinness it has been found limited quantities of gas will pass therethrough by the process of diffusion.

A first electrode 18 is supported by insulators 19 and 20 on the grille 15. Upon the upper wall of the housing 14 a tubular socket 21 is mounted, said tubular socket having an inturned flange 21' and being provided with L-shaped bayonet slots 23 and 23' for the reception of outwardly projecting pins 24 and 24' which are mounted on and project outwardly from a downwardly projecting leg 25 of the L-shaped handle 11, the other leg 26 of the handle projecting laterally. The legs 25 and 26 of the handle have cylindrical bores therethrough, 27 and 28 respectively which communicate with each other and receive insulators 29 and 30 respectively preferably made of "Teflon" and such insulators have communicating passages 31 and 32 respectively which are maintained in registry by any suitable means, such as having a notch cut in the inner end of the insulator 30 and having a registering notch in the insulator 29.

To provide for an effective seal between the leg 25 of the handle and the socket 21, a resilient O-ring 33 is supported in a circumferential groove of the leg 25 and engages the inner periphery of the socket 21 while a spring washer 34 reacts between the flange 21' of the socket and the lower end of the leg 25 of the handle, thereby maintaining a resilient pressure which retains the pins or lugs 24, 24' in the notches of the bayonet slots.

A fiber tubular insulating bushing 35 is provided with an external rib which is received in a rabbet groove on the inner periphery of the bottom of the leg 25 of the handle, the insulator being retained in position by the spring washer 34 which is held in position by means of screws or the like.

A metallic contact 37 is slidably received in a disk 38 which is threadedly secured in the fiber insulator element 35 and the lower end of such contact 37 engages with a resilient pressure an adjacent contact on the electrode 18. A spring 39 urges the contact 37 downwardly and reacts against a contact 40 connected to a conductor 41 which passes through the insulators 29 and 30 in the handle 11, whereby electrical contact is made between the insulated electrode 18 in the probe head and a contact element 42, which is screw threaded, into a fiber insulating bushing 43 which is externally threaded and received in a threaded portion 44 of the horizontal leg 26 of the handle. A contact 45 is slidably mounted in a reduced end portion of the bushing 43 and urged outwardly by a spring 46 reacting between the threaded disk contact 42 and a flange on the contact 45 whereby the contact 45 is urged against an apertured disk contact 47 which is soldered or otherwise fixed to the center conductor 48 of the coaxial cable 12, the contact 47 being supported by a fiber insulating washer 49 mounted in a rabbet groove on the inner periphery of a bore in one end of a nipple coupling element 50.

The coaxial cable 12 is secured in the coupling by means of a tubular rubber seal having a conical portion 51 projecting outwardly from the coupling and a cylindrical portion 52 received in a cylindrical bore in the outer end of the nipple 50 being retained therein by an apertured cap 53 through which the tapered portion of the seal passes, a washer 54 being forced by the adjacent flange of the cap 53 against the shoulder formed between the cylindrical portion 52 and the tapered portion 51 of the rubber seal. Another washer 55 reacting against the opposite end of the cylindrical portion 52 of the seal presses outwardly extending flanged portion 56 of the braided tubular conductor 57 of the coaxial cable 12 against a central circular abutment 58 of the nipple 50, thereby providing electrical contact of the tubular conductor 57 with the nipple 50. A thin metal sleeve 59 is positioned in the bore of the rubber seal to prevent cold flow of the rubber from compressing the coaxial cable 12 which compression could otherwise close the longitudinal gas passage in the coaxial cable.

Referring to various modifications of a coaxial cable (Figs. 5, 6 and 7), the central conductor in each is designated 48 and the braided tubular conductor indicated as 57 which is preferably covered with a protecting insulating and sealing cover 60 to provide a gas tight enclosure throughout the length of the cable. In each modification the central conductor is maintained in coaxial relation by suitable insulating material. In Fig. 5 the insulating material 61 is shown as being of rubber or the like, with a spiral passage 62 extending around the wire to provide for the passage of gas longitudinally through the coaxial cable. In Fig. 6 a spiral of insulating material is wrapped in space relation around the central conductor 48, leaving a spiral passage 64 for the passage of gas. In Fig. 7 a strip of insulating material 65 of circular cross-section is wrapped around the central conductor 48 thereby maintaining the coaxial relation between the braided tubular conductor 57 and the central conductor 48, leaving a helical space 66 providing a longitudinal passage for fluid through the cable.

The coaxial cable 12 is connected to the instrument case 13 by means of a nipple coupling element 67 having an inwardly extending flange 68 against which a flange 69 formed from the tubular conductor 57 is pressed by means of a washer 70 which engages the end of the cylindrical portion 71 of a tubular seal member which also includes a tapering conical portion 72, the tubular sealing member being held in sealing position by means of an apertured cap 73 threadedly connected to the outer end of the nipple 67 and having an inwardly extending flange which reacts against a washer 74 for urging the cylindrical portion 71 of the seal in tight engagement with the walls of the nipple as well as with the metallic washer 70, thereby providing a tight electric contact between the flange 69 of the tubular conductor and the nipple 67.

The inner end of the nipple 67 is provided with an outwardly extending flange 75 secured to the casing 13 by means of screws 76 with a gasket 77 located between the flange and the casing to obtain a tight seal. A "Kovar seal" 78 is mounted on the inner end of the nipple by means of an apertured plate 79 secured to the nipple by any suitable means such as screws or the like and the inner conductor 48 of the coaxial cable passes through such seal 78 in fluid-tight relation while being insulated from the nipple and casing. A supply of gas 80 is provided in the case 13 with suitable shut off valve 80A and/or a reducing valve 80B and such gas is supplied through a capillary tube 80C passing through the plate 79 into a cylindrical space 81 of the nipple 67. To prevent danger of excessive gas pressure within the coaxial cable 12 a rupture diaphragm 82 is provided in the nipple 67, being located in a pasage extending from the cylindrical space 81 to the atmosphere and being secured in fluid-tight relation against a shoulder in such passageway by means of a threaded ring 83.

From the above description it is believed that the operation of the device should be obvious. A source of electric energy is provided in the instrument case 13 with one terminal of the source connected to the central conductor 48 which is connected to the apertured contact plate 47 provided in the nipple 50 to contact 45 to spring 46 to contact element 42 to wire 41 to contact 40 through a spring 39 to contact 37 to the insulated electrode 18 in the probe head 10. The other conductor is provided by the ground of the casing 13 through the screws 76 to nipple 67 to flange 69 of the tubular conductor 57 of the coaxial cable to the flange 56 which contacts nipple connector 50 and to the handle 11 to the socket 21 through such socket and spring 34 to the probe head housing 14.

Gas is conducted from the gas supply bottle 80 under suitable pressure and with suitable valves which may include shut off valve 80A and reducing valve 80B and through capillary tube 80C into the space 81 thence into a passageway formed in the coaxial cable 12 which passageway may be of the type shown by passageways 62, 64, or 66, in Figs. 4 to 7, inclusive. The gas passes through the longitudinally extending passageway in the coaxial cable 12 into a cylindrical space 84 in the nipple coupling 50 and from such space 84 through apertures in the contact disk 47 and thence through the space provided by the clearance of slidable contact 45 and the fiber insulator 43 and thence through a suitable passage in disk contact 42 which passage in disk contact 42 may cooperate with an annular groove or the like which registers with passage 32 of the insulator 30 and from passage 32 to passage 31 in insulator 29 and from such passage 31 to a registering passage 85 which may include an annular groove in disk contact 40 into the interior of fiber insulator 35 and through the clearance between sliding contact 39 and retaining disk 38 into the chamber 17 of the probe head 10, thereby providing for the flow of gas from the bottle 80 to the probe head.

A valve 85 of the type conventionally used on gas masks to provide for flow of gas in one direction only is provided in the probe head 10, thereby permitting gas under excess presure in the probe head to pass out through the valve 86, but in the event of the pressure in the probe head being reduced the valve 86 serves as a check valve to prevent the atmospheric air from being drawn in whereby the gas remaining in the chamber 17 will be of a constant composition in accordance with the gas supplied from the gas bottle 80 to the capillary 80C as will be understood.

With the above structure it has been found that a gas of constant composition such as methane, argon, or propane may be supplied and that the gas will maintain a constant insulating effect between the insulated electrode 18 and the probe head casing 14 and therefore the voltage required to be impressed on the electrode 18 and the casing 14 has been reduced from approximately 2000 volts to approximately 1300 volts, while increasing the accuracy of information obtained from the device. The improved accuracy is believed to be obtained because of the constant characteristics of the gas in the probe head since such gas will not have variable composition of moisture or impurities and, consequently, alpha radiation which produces ionization of the gas in the probe head will have a direct effect on the amount in direct relation to the amount of alpha radiation being emitted from the material being tested and, consequently, the resulting information is an accurate indication of the radiation.

It has been found that gases will pass through the thin diaphragm 16 which is in the order of .0002 inch in thickness and that it is desirable to flush out any gases which may have passed through the diaphragm into the chamber 17, and this may be done by increasing the flow of gas from the bottle 80 through the nipple 67, coaxial cable 12, nipple 50, and handle 11 to the probe head until the contaminating gases are flushed out through a bleeder valve 86 and thereafter the flow of gas may be reduced while the detector is used. During periods of non-use the flow of gas may be stopped by valve 80A.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A proportional counter including a hollow head, a case spaced from said head, a flexible cable extending from the head to the case whereby the operator may pass the head in an irregular path along an area suspected of radiation so that the head may be of minimum weight, said flexible cable being of the coaxial type having a center wire and a tubular conductor with insulation therebetween for carrying the electric current with a minimum of interference, said cable being provided between said wire and tubular conductor with a passage for gas from the case to the head, means for supplying gas to the cable for transmission to the head for maintaining the head under sufficient pressure to prevent objectionable pollution of the gas to maintain a uniform degree of purity so that measurements made by the counter will be accurate measurements of the radiation while permitting the application of a low voltage to the electrode in the probe head.

2. A radiation detector comprising a case having a supply of electricity, a supply of gas and radiation detection indicators, a probe head having an insulated electrode, a handle on said probe head, a flexible coaxial cable connecting said handle to said casing and providing electrical conductors for applying a voltage to the insulated electrode and the probe head, means to detachably connect said probe head from its handle, and means to secure the cable in electrical contact with conductors in the handle and in the case to maintain a circuit which will be responsive to radiation penetrating into said probe head, said cable and said handle having a passage for gas from said supply to said probe head.

3. The invention according to claim 2 in which the coaxial cable is provided with a continuous passage for the gas within the tubular conductor, and the handle and probe head are provided with communicating passages whereby the gas supply in said case may be continuously furnished to the probe head.

4. A device for measuring radiation including a probe head, a case in which instruments and the like may be mounted, a coaxial cable extending from said probe head to said case, said coaxial cable having a spiral passage throughout its length through which gas may be supplied, a supply of gas under pressure in said case, means to supply the gas into the coaxial cable adjacent the case and means to conduct gas from the coaxial cable to the probe head whereby the gas will be fed through the passage in the coaxial cable to the probe head.

5. A connector for connecting a coaxial cable having a central conductor and a tubular conductor surrounding said central conductor to an object to provide insulated support for the central conductor from the object and from the tubular conductor and providing for the conduct of fluid through the coaxial cable to the object while maintaining insulation of the central conductor from the tubular conductor, said object having an internally threaded recess, a spring pressed contact in said object, a nipple threaded into said recess and having a contact for engagement with said spring contact, said nipple having a cylindrical recess in its other end and a cap threaded on the outer surface of said other end of the nipple, a tubular seal mounted in said recess at said other end for receiving the coaxial cable, the cap serving to maintain the seal and the coaxial cable in connected relation whereby the coaxial cable and the connector will conduct fluid as well as electrical impulses.

6. An insulated and fluid conducting coupling structure comprising a tubular element having outwardly projecting pins thereon, an insulator within said tubular element having a passage for the conduction of fluid, a conductor within said insulator, a contact fixed to the end of said conductor and mounted on the end of said insulator and having passageway registering with the fluid passage in said insulator, a tubular fiber insulating element abutting said insulator and said contact a spring-urged slideable contact mounted in said fiber insulating element and means on said insulating element and on said slideable contact for preventing outward removal of said slideable contact, a spring reacting on said contact of said insulator and against said slideable contact for maintaining electrical conductivity therebetween, a socket for receiving the tubular element and for cooperation with said pins for maintaining said tubular element in fixed relation, said socket being mounted in fixed relation to an electrode whereby the sliding contact may contact said electrode when said tubular element is mounted in fixed position in said socket, and means to provide a fluid tight joint between said tubular element and said socket whereby insulated conduction of electricity may be obtained while providing for the passage of fluid.

7. A proportional counter including a hollow probe head having a housing and an electrode insulated therefrom, a case spaced from said head and carrying a supply of gas for discharge into said hollow head, a flexible coaxial cable having a center conductor within a tubular conductor extending from said head to said case, said coaxial cable having a gas conducting passage within the tubular conductor thereof and between the center conductor and the tubular conductor, means to connect one end of said coaxial cable to said case and to said supply of gas so that the center conductor of said coaxial cable is insulated from said case and the tubular conductor is electrically connected to said case, means to connect the cable to said probe head so that the center conductor of said coaxial cable extends to the electrode in the probe head and is insulated from the housing, the gas conducting passage of said coaxial cable providing communication in substantially gas tight relation between the supply of gas and the probe head whereby gas from the gas supply may flow through said coaxial cable to said probe head.

8. The invention according to claim 7 in which the connection of said coaxial cable to said probe head includes a handle connectable to the probe head in a position with the handle extending longitudinally away from the probe head or with the handle substantially overlying the probe head, the connection including a bayonet type connection having diametrically opposed prongs in one element and diametrically opposed slots in the other element.

9. A radiation counter comprising a probe head, a handle extending from said probe head, means to connect one end of said handle to said probe head in fluid tight relation, means to connect the other end of said handle in fluid tight relation to a coaxial cable having a passage for gas extending the length of such coaxial cable, said handle having a passage for gas communicating with the gas passage in said coaxial cable and the probe head whereby the coaxial cable serves to provide voltage to said probe head and also to provide gas to said probe head whereby a constant and uniform atmosphere is provided within said probe head at all times.

10. The invention according to claim 9 in which the handle is L-shaped with one leg being cylindrical and the connection of said handle to said probe head includes a cylindrical socket on said probe head receiving said cylindrical leg of said handle, diametrically opposed bayonet slot and lug means on said leg and said socket, said cylindrical leg having a rabbet recess, an insulator having a shoulder in said recess at the free end of said cylindrical leg, a spring flange secured to the end of the leg and engaging the shoulder on the insulator, an O-ring on said cylindrical leg between said spring and said bayonet slot and lug means to provide a fluid tight connection between the handle and the probe head, the connector of the coaxial cable with the other leg of said handle including a nipple mounted on the other leg of the handle and having an inturned shoulder intermediate its ends, a resilient sleeve engaging the coaxial cable and received in the free end of said nipple, a portion of the tubular conductor of said coaxial cable being outwardly flanged and engaging and making electrical contact with the shoulder in said nipple, the center conductor of said coaxial cable being connected to insulated contacts and a conductor extending through said handle and engaging spring pressed contacts engageable with the center conductor of said coaxial cable and the insulated electrode of said probe head.

11. The invention according to claim 10 in which the handle and nipple are of conductive material to provide a conductive path from the tubular conductor of said coaxial cable to said probe head.

12. The invention according to claim 11 in which a supply of gas is connected to the coaxial cable and suitable control valves are provided between the supply of gas and the coaxial cable to control the flow of gas and a one way outlet valve is provided in the probe head to permit the release of excess pressure in the probe head and to permit flushing of the gases from the probe head by the flow of gas from the supply.

13. The combination with a probe head and an instrument box having electronic equipment therein and a supply of gas therein of a connecting coaxial cable having a central conductor and a tubular conductor separated by helically wound insulating material leaving a helical passage between adjacent turns of the helical insulation, a connector on the box and a connector on the probe into which the ends of the cable extend, a sleeve on a portion of the cable in each connector of sufficient strength to prevent excessive radial compression of the cable, a rubber seal surrounding said sleeve and having an enlarged portion compressed to provide a tight frictional bond and fluid-tight seal, said rubber seal having an outwardly tapering portion extending from the coupling member in which it is located towards the other coupling member to prevent excessive bending of the coaxial cable adjacent the coupling.

14. A connector for a coaxial cable having insulation between its central and tubular conductors and having a passage for fluid to provide for the flow of fluid and for insulation of the central conductor from the outer conductor, said connector including a tubular member of conductive material for connection at one of its ends to the coaxial cable and for electrical connection to the tubular conductor, an insulator in the other end of the tubular member, a central contact in said insulator for electrical connection to the central conductor of the coaxial cable, said insulator having a passage for fluid and said tubular member having a restricted passage intermediate its ends for receiving the central conductor receiving some of the insulation between the central conductor and the tubular conductor, means to connect the coaxial cable to said connector in fluid tight connection and to connect the tubular conductor of the coaxial cable to the tubular member in electrical conducting relation, said central electrical contact being directly securable to the central conductor to assure positive electrical connection, said tubular member providing substantially unobstructed communication from the fluid passage of the coaxial cable through the connector and beyond the central electrical contact whereby a plurality of electrically conductive paths are provided from a single cable and a single connector to provide for the passage of fluid through the coaxial cable and the connector to a housing connectable to the connector.

15. A connector providing insulated conductivity of electricity as well as the transmission of a fluid from a cable having a central insulated conductor and an outer conductor and a passage for fluid, said connector including a nipple having a recess extending inwardly from one end thereof, a tubular seal mounted in said recess and projecting outwardly therefrom for receiving a cable, means to secure and seal the cable in fixed relation to said nipple and to connect the other conductor of said cable to said nipple in electrically conductive relation, the other end of said nipple being provided with a fluid receiving space, an insulator closing the outer end of said space and sealing the central conductor of said cable passing through said insulator, a rupture disc mounted in said other end of said nipple to provide for release of excess pressure in said space, and means to supply fluid to said space whereby fluid may be forced into an insulated conductor secured to the one end thereof.

16. The invention according to claim 7 in which the connection of said coaxial cable to said probe head includes a handle connectible with the probe head in a position with the handle extending longitudinally away from the probe head or with the handle overlying the probe head, the connection including cooperating means on said handle and probe head for positively retaining the handle on said probe head.

17. The invention according to claim 7 in which a shut-off valve and a reducing valve are provided between said supply of gas and said coaxial cable to control the flow of gas.

18. The invention according to claim 9 in which the handle is L-shaped with one leg being cylindrical and the connection of said handle to said probe head includes a cylindrical socket on said probe head receiving said cylindrical leg of said handle, cooperating means on said handle and probe head for positively retaining the handle on said probe head, said cylindrical leg having a recess, an insulator in said recess at the free end of said cylindrical leg, a spring between the socket of said probe head and the said cylindrical leg of said handle, an O-ring on one of said cylindrical legs and socket between said spring and said cooperating means to provide a fluid tight connection between the handle and the probe head, the connector of the coaxial cable with the other leg of said handle including a nipple mounted on the other leg of the handle and having an inturned shoulder intermediate its ends, a resilient sleeve engaging the coaxial cable and received in the free end of said nipple, a portion of the tubular conductor of said coaxial cable being outwardly flanged and engaging and making electrical contact with the shoulder in said nipple, the center conductor of said coaxial cable being connected to insulated contacts and a conductor extending through said handle and engaging spring pressed contacts engageable with the center conductor of said coaxial cable and the insulated electrode of said probe head.

References Cited in the file of this patent

UNITED STATES PATENTS

| | | |
|---|---|---|
| 2,321,782 | Von Mertens | June 15, 1943 |
| 2,381,003 | Ryan | Aug. 7, 1945 |
| 2,428,546 | Breitenstein | Oct. 7, 1947 |
| 2,441,277 | Lamphere | May 11, 1948 |
| 2,461,834 | Morin | Feb. 15, 1949 |
| 2,492,449 | Tuller | Dec. 27, 1949 |
| 2,519,933 | Rouault | Aug. 22, 1950 |
| 2,556,224 | Scott | June 12, 1951 |
| 2,580,838 | Rhodes | Jan. 1, 1952 |
| 2,656,476 | Firminhac | Oct. 20, 1953 |
| 2,666,865 | Borkowski | Jan. 19, 1954 |
| 2,755,331 | Melcher | July 17, 1956 |